United States Patent [19]

Fain

[11] 4,304,110
[45] Dec. 8, 1981

[54] STEERING WHEEL LOCK BAR

[76] Inventor: Warren R. Fain, 2006 E. 61st St., Brooklyn, N.Y. 11234

[21] Appl. No.: 124,303

[22] Filed: Feb. 25, 1980

[51] Int. Cl.³ .............................................. B60R 25/02
[52] U.S. Cl. .................................. 70/209; 280/289 L
[58] Field of Search ............. 280/727, 289 L; 70/209, 70/212, 238; 180/287

[56] References Cited

U.S. PATENT DOCUMENTS

| 3,462,982 | 8/1969 | Moore | 70/209 |
| 3,742,743 | 7/1973 | Stoyanovitch | 70/209 |
| 3,898,823 | 8/1975 | Ludeman | 70/209 X |
| 4,103,524 | 8/1978 | Mitchell et al. | 70/209 |

FOREIGN PATENT DOCUMENTS

| 106072 | 3/1967 | Denmark | 70/209 |
| 631708 | 6/1936 | Fed. Rep. of Germany | 70/209 |
| 1127524 | 9/1968 | United Kingdom | 70/209 |

Primary Examiner—Joseph F. Peters, Jr.
Assistant Examiner—Michael Mar
Attorney, Agent, or Firm—Richard L. Miller

[57] ABSTRACT

An elongated bar securable across a diameter of an automobile steering wheel so as to prevent it being turned; the bar including a hook along its side for hooking around the steering wheel rim and also having a pair of spaced apart, sideward lugs located spaced away from the hook so that a diametrically opposite side of the rim is inserted between the lugs, and each lug having a hole therethrough for a padlock so as to prevent removal of the rim from between the lugs.

1 Claim, 6 Drawing Figures

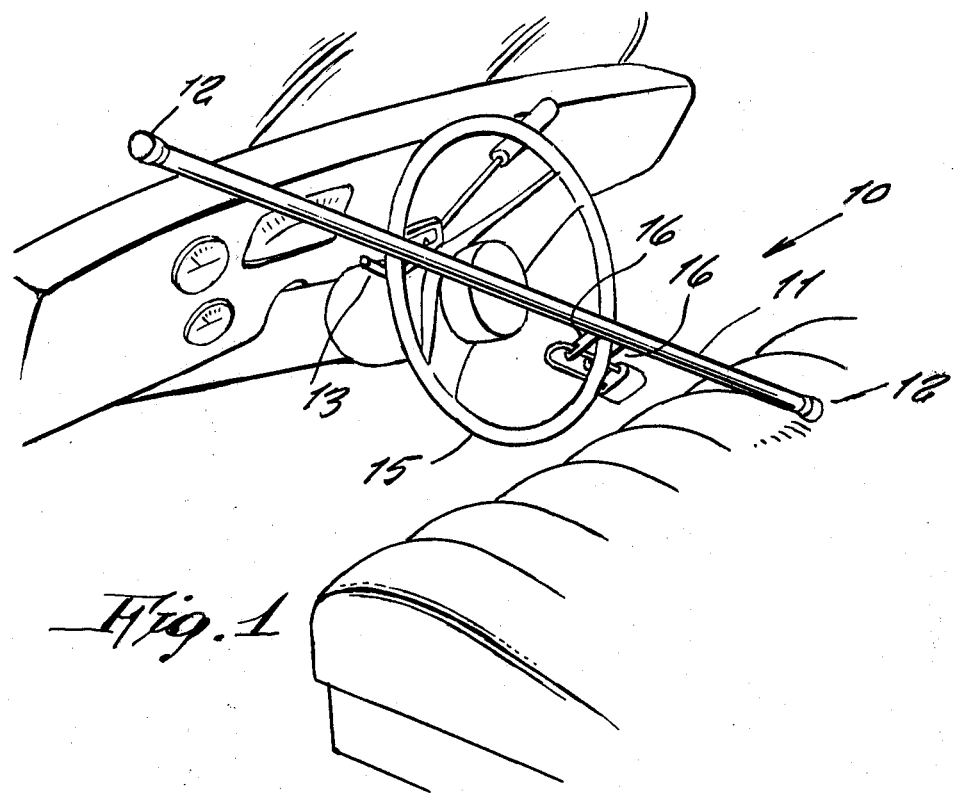
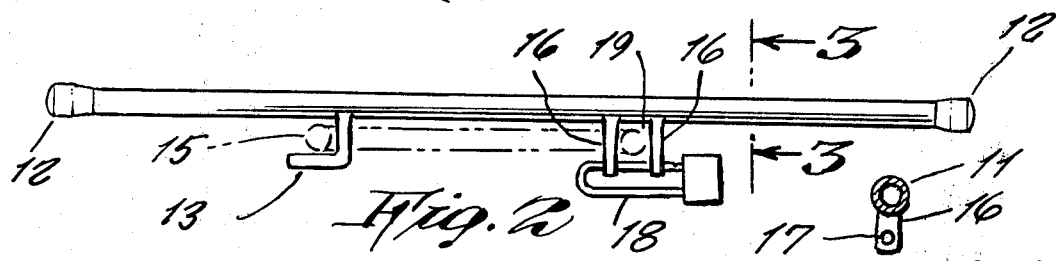
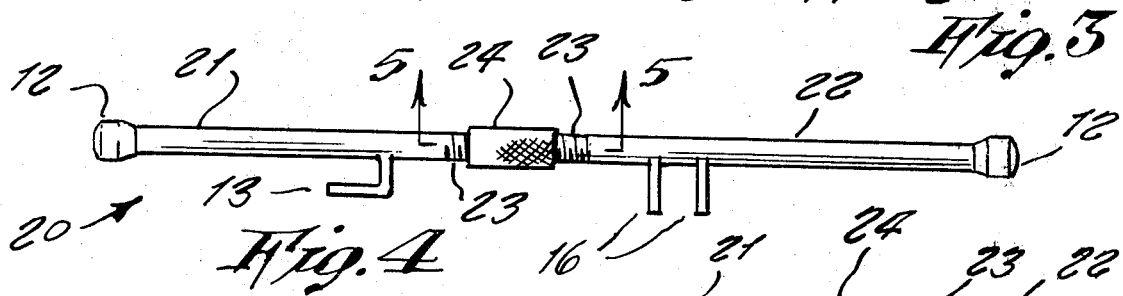
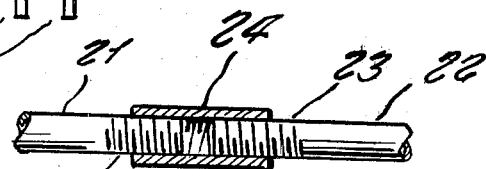
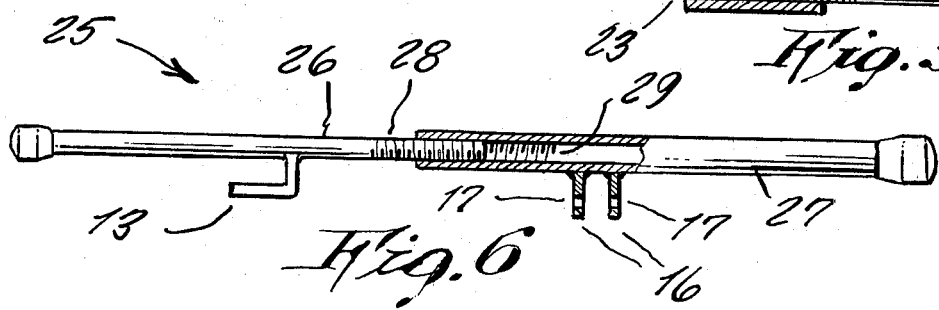

STEERING WHEEL LOCK BAR

BACKGROUND OF THE INVENTION

This invention relates generally to automobile anti-theft devices.

It is well known that numerous automobiles are stolen each year because most thieves know how to start up a car without a key so that once the thief gains entry inside the vehicle, there is nothing to prevent him from driving it off. This situation is accordingly in need of an improvement.

SUMMARY OF THE INVENTION

Therefore it is a principal object of the present invention, to provide a bar which is clamped across a steering wheel of the vehicle, so that even if the engine is started and a thief gains entry inside the car, then the steering wheel is unable to be turned for steering the vehicle, so that the vehicle is further protected against theft.

Another object is to provide a steering wheel lock bar which does not in any way mar or injure the steering wheel, and which is quick and easy to apply or remove.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a driver's area of an automobile interior, showing the invention mounted on the steering wheel.

FIG. 2 is a side view of steering wheel lock bar illustrated in FIG. 1.

FIG. 3 is a cross sectional view on line 3—3 of FIG. 2, showing the lug holes that receive the padlock.

FIG. 4 is a side view of another design of the wheel lock bar, which is adjustable in length.

FIG. 5 is a cross sectional view on line 5—5 of FIG. 4, shown enlarged.

FIG. 6 is a side view of still another design which is also adjustable in length.

DETAILED DESCRIPTION OF PREFERRED EMBODIMENT

Referring now to the drawing in greater detail, and more particularly to FIGS. 1, 2 and 3 thereof at this time, the reference numeral 10 represents a steering wheel lock bar according to the present invention, wherein there is an elongated straight bar member 11 that is made of a tough steel so that it cannot be bent. The surface of the bar is polished so that it will not scratch any object against which it is placed. A rubber end cap 12 is fitted on each end thereof. The bar is preferably approximately four feet long.

A steel hook 13 is welded to a side of the bar, so that it can be hooked around the vehicle steering wheel rim 15.

A pair of steel lugs 16 are also welded to the same side of the bar, and are spaced apart so that a diametrically opposite side of the wheel rim can be fitted between the lugs.

Each lug has a hole 17 therethrough, the holes of the two lugs being aligned so that a padlock 18 can be inserted through both, thus locking the wheel rim inside a space 19 formed between the lugs.

Thus mounted on the steering wheel rim, the bar cannot be removed by a thief, and the extending opposite ends of the bar extend excessively too far so as to permit the wheel to be turned. The bar ends may be stopped in rotation by the vehicle seat, windshield or car ceiling.

In a modified design of steering wheel lock bar 20 showing in FIGS. 4 and 5, the same is made of two short bars 21 and 22 which have a screw thread 23 at their one ends for being screwed in opposite ends of a threaded sleeve 24. One of the bars 21 has the above-described hook 13 and the other bar 22 has the above-described lugs 16. This form of the invention allows the bars, when disassembled, to fit in a smaller storage place inside the vehicle when not used. Also this design allows the hook and lugs to be made any desired distances apart so that the invention is adaptable for either smaller or larger diameter steering wheels. When the bars 21 and 22 are assembled together they may be approximately the same assembled length as the single bar 11, described above.

In a further modified design of steering wheel lock bar 25, shown in FIG. 6, the same is comprised of a pair of steel bars 26 and 27 which screw together instead into a sleeve therebetween. In this design, one bar has an external screw thread 28 and the other has an internally threaded hole 29 in one end thereof. Alternately the bar 27 may comprise a pipe. The bar 26 carries the hook while the bar 27 carries the lugs, as described above.

Thus different designs of the invention are presented.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A steering wheel lock comprising, an elongated straight bar having a first portion and a second portion, each of said first and second portions having a first end and a second end remote from said first end; an L-shaped hook projecting from a side of said first portion between said first and second ends thereof for engaging a portion of a steering wheel to be locked in position; a pair of spaced parallelly disposed lugs, extending from a side of said second portion thereof corresponding to the side of said first portion from which said hook projects, each of said pair of lugs having a hole formed therethrough in mutual alignment with the other hole of the other lug, said pair of lugs sandwiching therebetween another portion of a steering wheel to be locked in position at a diametrically opposed portion of the steering wheel as the portion engaged by said L-shaped hook; said second end of said first portion being threaded on the outer surface thereof, and said second end of said second portion also being threaded on the outer surface thereof, said first end of each of said first and second portions extending an appreciable distance from a steering wheel when mounted thereon, and each of said first ends having a rubber end cap mounted thereon for prevention of damage to the vehicle by said portions; a threaded sleeve having a threaded opening therethrough for mating engagement with said threaded second ends of said first and second portions, said threaded sleeve having a first end for receiving therein said second end of said first portion and a second end for receiving therein said second end of said second portion, whereby said first and second portions are adjustable relative to each other in a direction taken along the length of each of said first and second portions; and a padlock for locking said elongated straight bar to a steering wheel at that portion between said pair of lugs, said padlock being received in said holes formed in said pair of lugs, each said hole being formed in a respective lug at a location adjacent the end thereof remote from said second portion, whereby said elongated bar may be adjustable lengthwise to fit various sized steering wheels for locking the steering wheels in position.

* * * * *